United States Patent
Seraj et al.

(10) Patent No.: US 11,075,507 B2
(45) Date of Patent: Jul. 27, 2021

(54) SEALANT REPAIR SYSTEMS AND METHODS FOR OUTER JACKET LAYERS OF CABLES AND CABLE ACCESSORIES

(71) Applicant: TE Connectivity Services GmbH, Schaffhausen (CH)

(72) Inventors: Mahmoud K. Seraj, Apex, NC (US); Brian Ayres, Raleigh, NC (US)

(*) Notice: Subject to any disclaimer, the term of this patent is extended or adjusted under 35 U.S.C. 154(b) by 0 days.

(21) Appl. No.: 16/796,309

(22) Filed: Feb. 20, 2020

(65) Prior Publication Data

US 2020/0274337 A1 Aug. 27, 2020

Related U.S. Application Data (60) Provisional application No. 62/809,059, filed on Feb. 22, 2019.

(51) Int. Cl.
*H02G 1/16* (2006.01)
*H02G 15/18* (2006.01)

(52) U.S. Cl.
CPC ............. *H02G 1/16* (2013.01); *H02G 15/18* (2013.01)

(58) Field of Classification Search
CPC ........... H01B 1/16; H01B 15/18; H02G 15/08
USPC .................. 174/74 R, 76, 77 R, 84 R, 88 R
See application file for complete search history.

(56) References Cited

U.S. PATENT DOCUMENTS

| | | | | |
|---|---|---|---|---|
| 2,967,795 A | * | 1/1961 | Bollmeier | H02G 15/196 174/84 R |
| 3,258,522 A | * | 6/1966 | Bartos | H01B 3/46 174/84 R |
| 3,361,605 A | * | 1/1968 | Gilbert | H02G 15/196 156/48 |
| 3,406,820 A | * | 10/1968 | Bond | C09J 7/255 428/351 |
| 3,781,458 A | * | 12/1973 | May | H02G 15/196 174/84 C |
| 4,212,387 A | | 7/1980 | Kotski et al. | |

(Continued)

FOREIGN PATENT DOCUMENTS

| | | |
|---|---|---|
| CN | 104134954 A | 11/2014 |
| WO | 9821796 A1 | 5/1998 |

OTHER PUBLICATIONS

"International Search Report and Written Opinion for PCT/US2020/019052 dated May 18, 2020."

(Continued)

*Primary Examiner* — William H. Mayo, III (57) ABSTRACT

A method for repairing a damaged area of an outer jacket layer of a cable or cable accessory includes: applying sealant to a strip of flexible material; forming a preliminary sealant layer on the damaged area and around an entire circumference of the outer jacket layer by sliding the strip of flexible material relative to the outer jacket layer with the sealant in contact with the outer jacket layer; wrapping the strip of flexible material around the entire circumference of the outer jacket layer and the preliminary sealant layer, wherein the preliminary sealant layer holds the strip of flexible material in place after the wrapping; and allowing the sealant to cure to thereby form a final sealant layer on the damaged area and around the entire circumference of the outer jacket layer, wherein the strip of flexible material holds the sealant in place while allowing the sealant to cure.

18 Claims, 10 Drawing Sheets

(56) References Cited

U.S. PATENT DOCUMENTS

| | | | | | |
|---|---|---|---|---|---|
| 4,497,760 | A | * | 2/1985 | Sorlien | B29C 65/18 |
| | | | | | 156/86 |
| 4,545,830 | A | * | 10/1985 | Dienes | H02G 1/14 |
| | | | | | 156/48 |
| 5,070,597 | A | * | 12/1991 | Holt | F16L 5/02 |
| | | | | | 138/103 |
| 6,719,462 | B2 | * | 4/2004 | Hershkowitz | G02B 6/255 |
| | | | | | 385/147 |
| 9,365,756 | B1 | | 6/2016 | Jolley et al. | |

OTHER PUBLICATIONS

Anonymous, ""Poppstar 1x 3m Self-Fusing Silicone Band, Silicone Tape, Repair Tape, Electrical Tape and Sealing Strip (Water-Tight, air-Tight), 25mm Wide, Transparent: Amazon.co.uk: DIY & Tools", May 12, 2017 (May 12, 2017), XP055693278, Retrieved from the Internet <URL:".

* cited by examiner

SEALANT REPAIR SYSTEMS AND METHODS FOR OUTER JACKET LAYERS OF CABLES AND CABLE ACCESSORIES

RELATED APPLICATIONS

This application claims priority from U.S. Provisional Application No. 62/809,059, filed Feb. 22, 2019, the disclosure of which is incorporated by reference herein in its entirety.

BACKGROUND

The present invention is directed to repair methods and systems to seal partial material damage to the outer jacket layer of cold shrink joints and/or cables.

Cold shrink joints can contain greases such as silicone grease that can prevent proper adhesion with existing mastic and/or tape repair kits. In addition, repair with existing mastic and/or tape repair kits can be inhibited by a small working space around the repair site.

SUMMARY

Some embodiments of the present invention are directed to a method for repairing a damaged area of an outer jacket layer of a cable or cable accessory. The method includes applying sealant to a strip of flexible material. The method includes forming a preliminary sealant layer on the damaged area and around an entire circumference of the outer jacket layer by sliding the strip of flexible material relative to the outer jacket layer with the sealant in contact with the outer jacket layer. The method includes wrapping the strip of flexible material around the entire circumference of the outer jacket layer and the preliminary sealant layer, wherein the preliminary sealant layer holds the strip of flexible material in place after the wrapping. The method includes allowing the sealant to cure to thereby form a final sealant layer on the damaged area and around the entire circumference of the outer jacket layer, wherein the strip of flexible material holds the sealant in place while allowing the sealant to cure.

In some embodiments, the sealant includes room temperature vulcanizing (RTV) silicone.

In some embodiments, the strip of flexible material is transparent.

In some embodiments, the strip of flexible material includes biaxially-oriented polyethylene terephthalate (BoPET) film.

In some embodiments, the strip of flexible material includes first and second opposite ends, and wrapping the strip of flexible material around the entire circumference of the outer jacket layer and preliminary sealant layer includes overlapping the first and second ends.

In some embodiments: the strip of flexible material includes first and second opposite sides; the first side faces and contacts the preliminary sealant layer and then the final sealant layer; and the second side faces away from the preliminary sealant-layer and then the final sealant layer.

In some embodiments, the method includes applying a solvent to the outer jacket layer prior to forming the sealant layer on the damaged area.

In some embodiments, the cable or cable accessory includes a cold shrink sleeve.

In some embodiments, the cable or cable accessory includes a cable.

Some other embodiments of the present invention are directed to a seal system. The system includes a cable or cable accessory comprising an outer jacket layer having a damaged area, a sealant layer on the damaged area and surrounding an entire circumference of the outer jacket layer, and a retention layer comprising a strip of flexible material directly on the sealant layer and surrounding the entire circumference of the outer jacket layer.

In some embodiments, the sealant layer includes room temperature vulcanizing (RTV) silicone.

In some embodiments, the strip of flexible material is transparent.

In some embodiments, the strip of flexible material includes BoPET film.

In some embodiments: the strip of flexible material includes first and second opposite sides; and In some embodiments, the strip of flexible material includes first and second opposite ends that overlap such that the first side of the first end directly contacts the sealant layer and the first side of the second end overlies and optionally directly contacts the second side of the first end.

In some embodiments: the strip of flexible material includes first and second opposite sides; the first side faces and contacts the preliminary sealant layer and then the final sealant layer; and the second side faces away from the preliminary sealant layer and then the final sealant layer.

In some embodiments, the cable or cable accessory includes a cold shrink sleeve.

In some embodiments, the cable or cable accessory includes a cable.

Further features, advantages and details of the present invention will be appreciated by those of ordinary skill in the art from a reading of the figures and the detailed description of the preferred embodiments that follow, such description being merely illustrative of the present invention.

DETAILED DESCRIPTION

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that when an element is referred to as being "coupled" or "connected" to another element, it can be directly coupled or connected to the other element or intervening elements may also be present. In contrast, when an element is referred to as being "directly coupled" or "directly connected" to another element, there are no intervening elements present. Like numbers refer to like elements throughout. As used herein the term "and/or" includes any and all combinations of one or more of the associated listed items.

In addition, spatially relative terms, such as "under," "below," "lower," "over," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly.

Well-known functions or constructions may not be described in detail for brevity and/or clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes" and/or "including," when used in this specification, specify the presence of stated features, integers, steps, operations, elements, and/or components, but do not preclude the presence or addition of one or more other features, integers, steps, operations, elements, components, and/or groups thereof.

It is noted that any one or more aspects or features described with respect to one embodiment may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1:
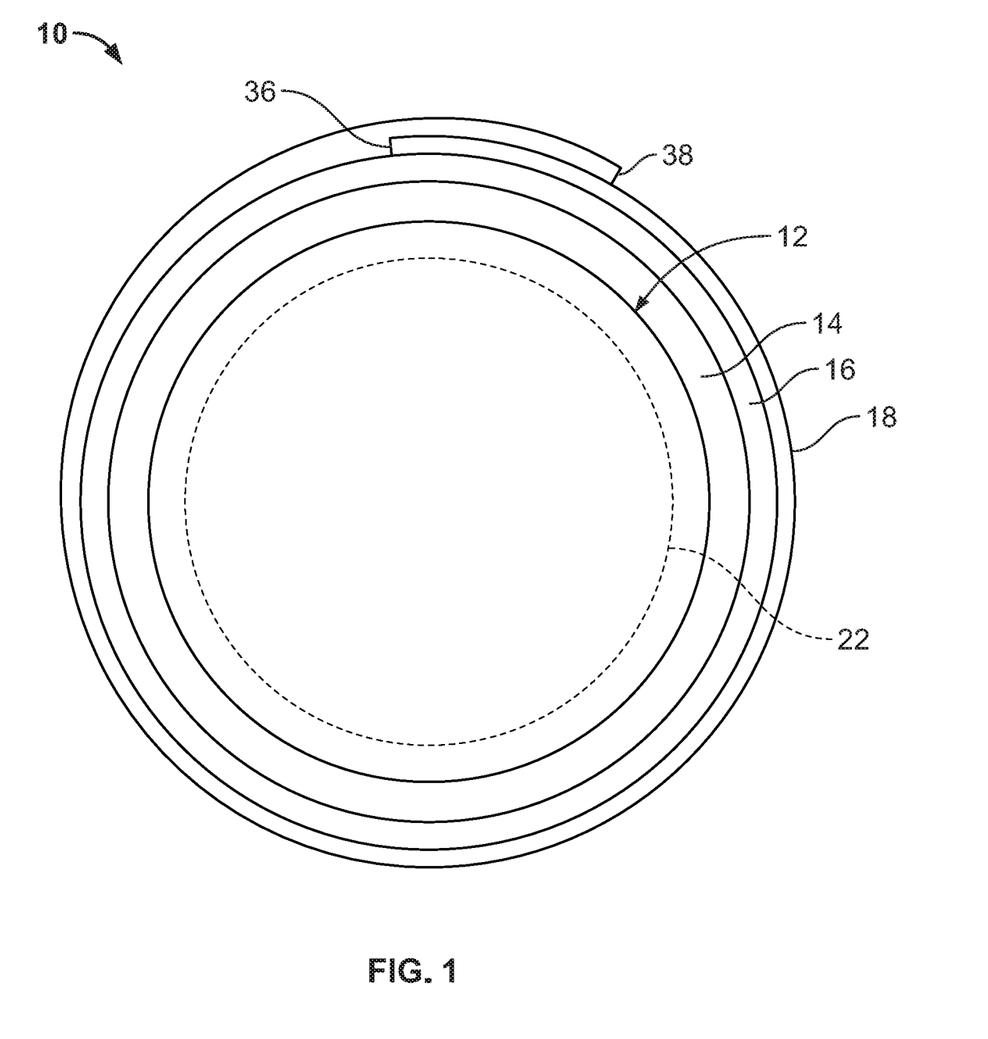
FIG. 1 is a sectional view of a seal repair system according to some embodiments of the present invention.
Figure 2:
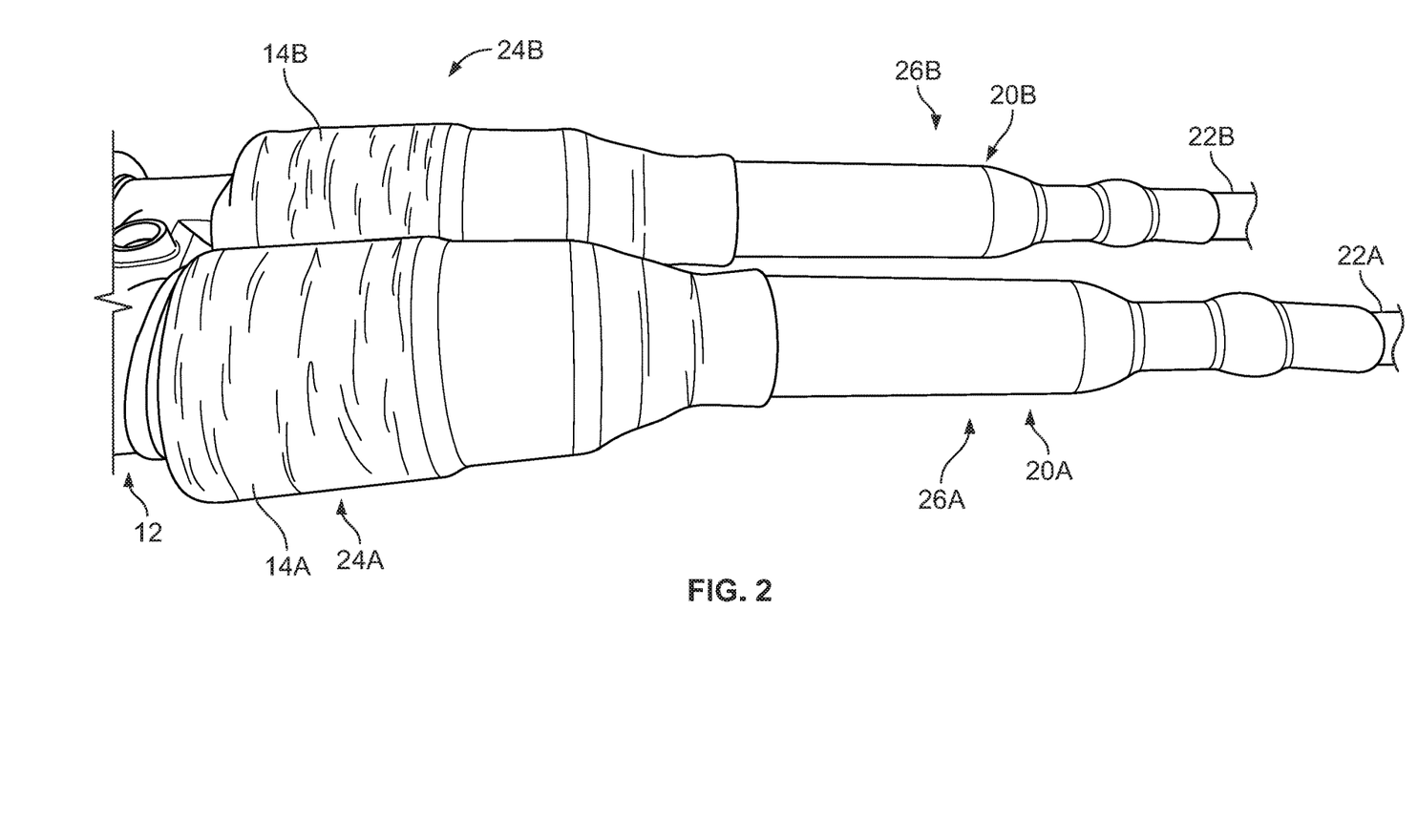
FIG. 2 is a perspective view of a cable connection system including cables, a connector, and cold shrink sleeves.

FIG. 1 is a sectional view of a seal repair system 10 according to some embodiments of the invention. The system 10 may include a substrate 12, an outer jacket layer 14 of a cable or cable accessory, a sealant layer 16 (also referred to herein as a final sealant layer), and a sealant application layer and/or sealant retention layer 18. As shown in FIG. 2, in some embodiments, the tubular substrate 12 is defined by an electrical connector or fitting. However, other types and configurations of substrates such as accessories, joints, and splices for power transmission cables may be provided in accordance with other embodiments of the invention.

FIG. 2 shows the connector 12 that may include first and second receptacles 20A and 20B for receiving first and second cables 22A and 22B, respectively. As illustrated, a cover sleeve 24A covers the first receptacle 20A of the connector 12 and/or the cable 22A and a cover sleeve 24B covers the second receptacle 20B of the connector 12 and/or the cable 22B. Also as illustrated, a cover sleeve 26A covers the first receptacle 20A of the connector 12 and/or the cable 22A and a cover sleeve 26B covers the second receptacle 20B of the connector 12 and/or the cable 22B.

It will be understood that the present invention is applicable to connectors and fittings that include only one receptacle or more than two receptacles. For example, the connector 12 may have only the first receptacle 20A and the cable 22A. Further, the cover sleeves 26A and 26B are not necessary for the present invention and are shown for illustrative purposes only. For example, the connector 12 may be more compact or shorter than illustrated, and only the cover sleeve 24A and optionally the cover sleeve 24B (for a two receptacle connector) may be employed.

The cover sleeve 24A includes an outer jacket layer 14A and the cover sleeve 24B includes an outer jacket layer 14B, and either the outer jacket layer 14A or the outer jacket layer 14B may define the outer jacket layer 14 shown in FIG. 1. In some embodiments, the cover sleeve 24A and/or the cover sleeve 24B is a cold shrink cover, meaning that it can be shrunk or contracted about a substrate (e.g., the connector 12 and/or the cables 22A, 22B) without requiring the use of applied heat. In some embodiments, the cover sleeve 24A and/or the cover sleeve 24B is a Cold Shrink Disconnectable Joint (CSJD) available from TE Connectivity.

Figure 3:
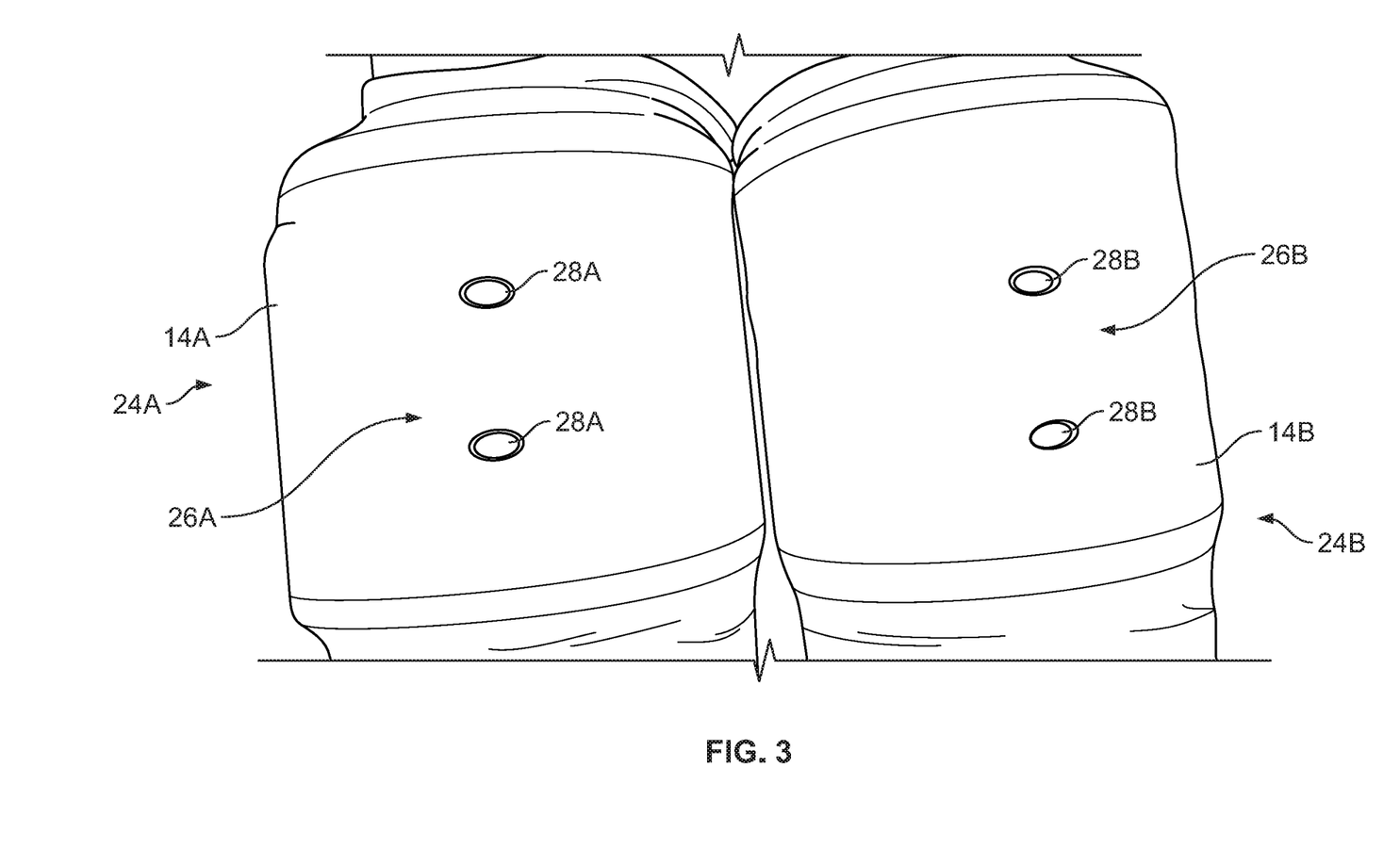
FIG. 3 is a perspective view illustrating the cold shrink sleeves of FIG. 2 including damaged areas.

Referring to FIG. 3, the cover sleeve 24A includes a damaged area 26A in or on the outer jacket layer 14A and the cover sleeve 24B includes a damaged area 26B in or on the outer jacket layer 14B. In some embodiments and as illustrated, the damaged areas 26A, 26B include holes 28A, 28B that penetrate fully through the outer jacket layers 14A, 14B such that the cover sleeves 14A, 14B are no longer watertight. In some other embodiments, the damaged area(s) could include rips or seams, or could include damage such as scratches or scuffs that do not necessarily extend through the entire outer jacket layer but compromise the structural integrity of the sleeve.

The sleeves (or outer jacket layers thereof) may be damaged in a number of ways. As an example, the sleeves may be cold shrink covers that may be damaged during manufacturing (e.g., the fingers or prongs of expansion machinery may form holes in the outer jacket layers of the sleeves). As another example, the outer jacket layers of the sleeves may be damaged during installation. The cable system including the sleeves may be used for underground applications, and this environment may include rocks and other sharp objects that may puncture, rip, or tear the outer jacket layers of the sleeves.

Figure 4:
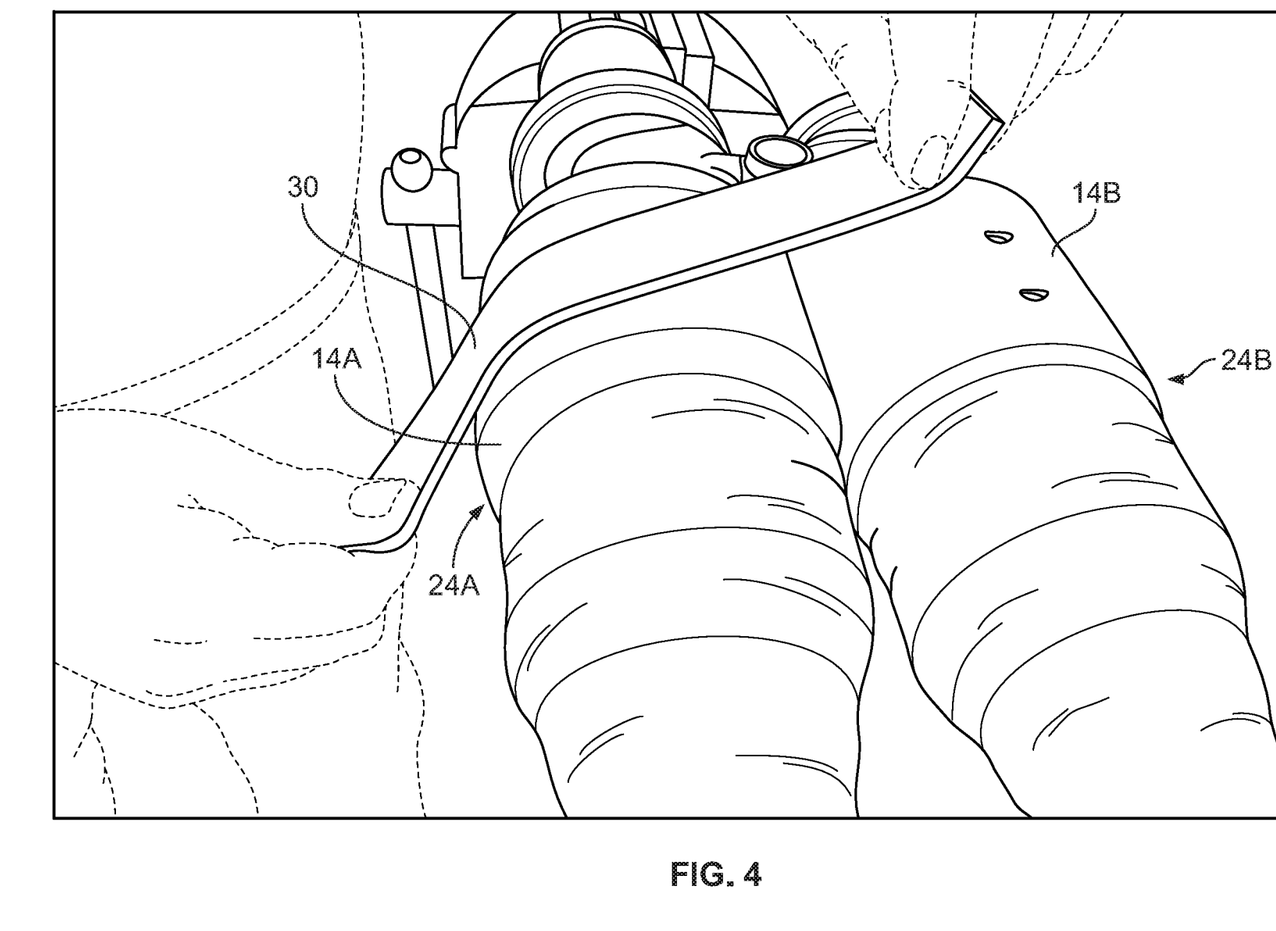
FIG. 4 is a perspective view illustrating the application of solvent to outer layers of the cold shrink sleeves of FIG. 3.

In some embodiments, a solvent is applied to the outer jacket layer 14A and/or the outer jacket layer 14B as shown in FIG. 4. The solvent may be applied using a cloth or wipe 30. The solvent may include, but is not limited to, alcohol. In some embodiments, the solvent is applied using PF Solvent Wipes available from PT Technologies.

Figure 5:
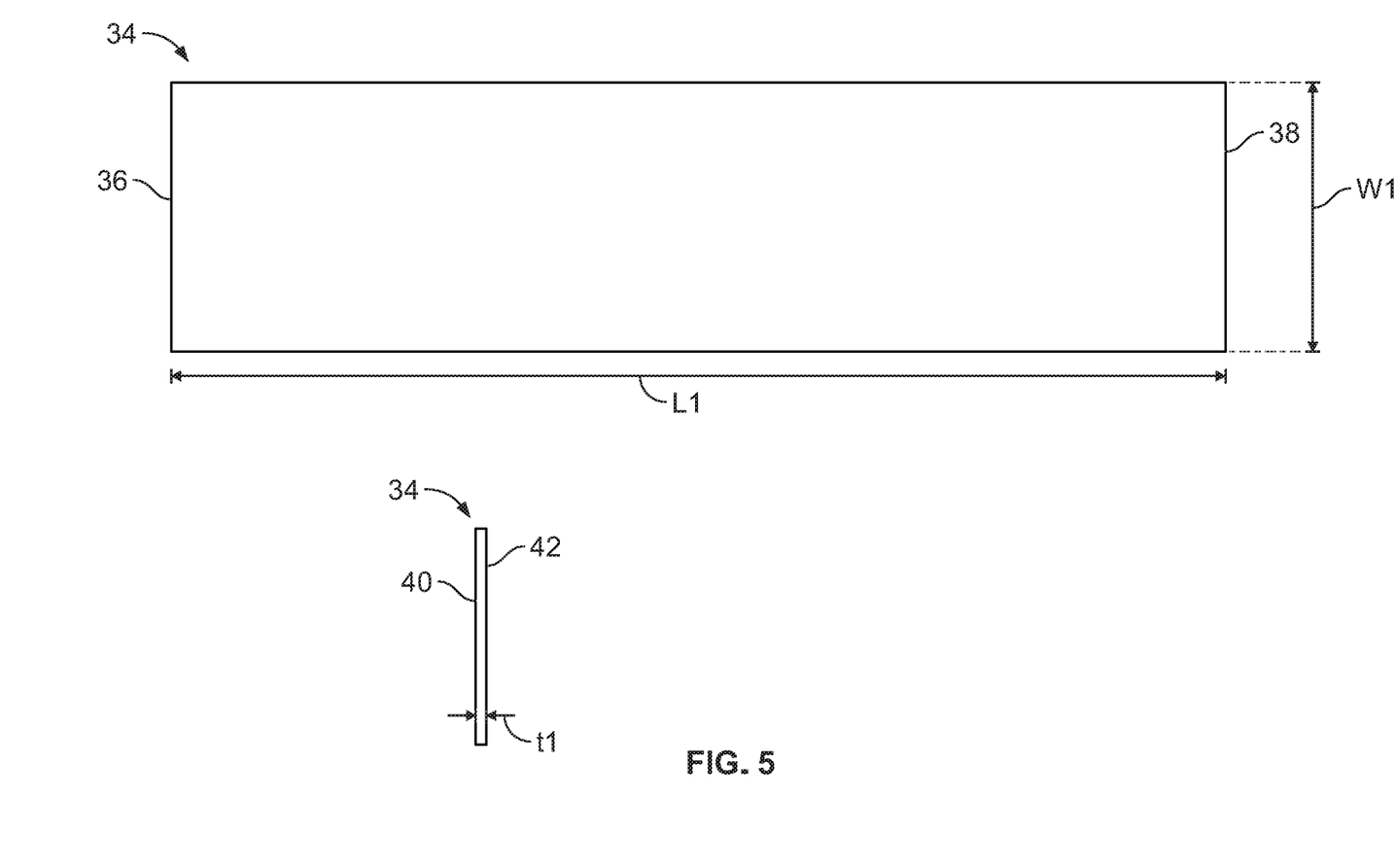
FIG. 5 includes a side view and an end view of a strip of flexible material according to some embodiments.
Figure 6:
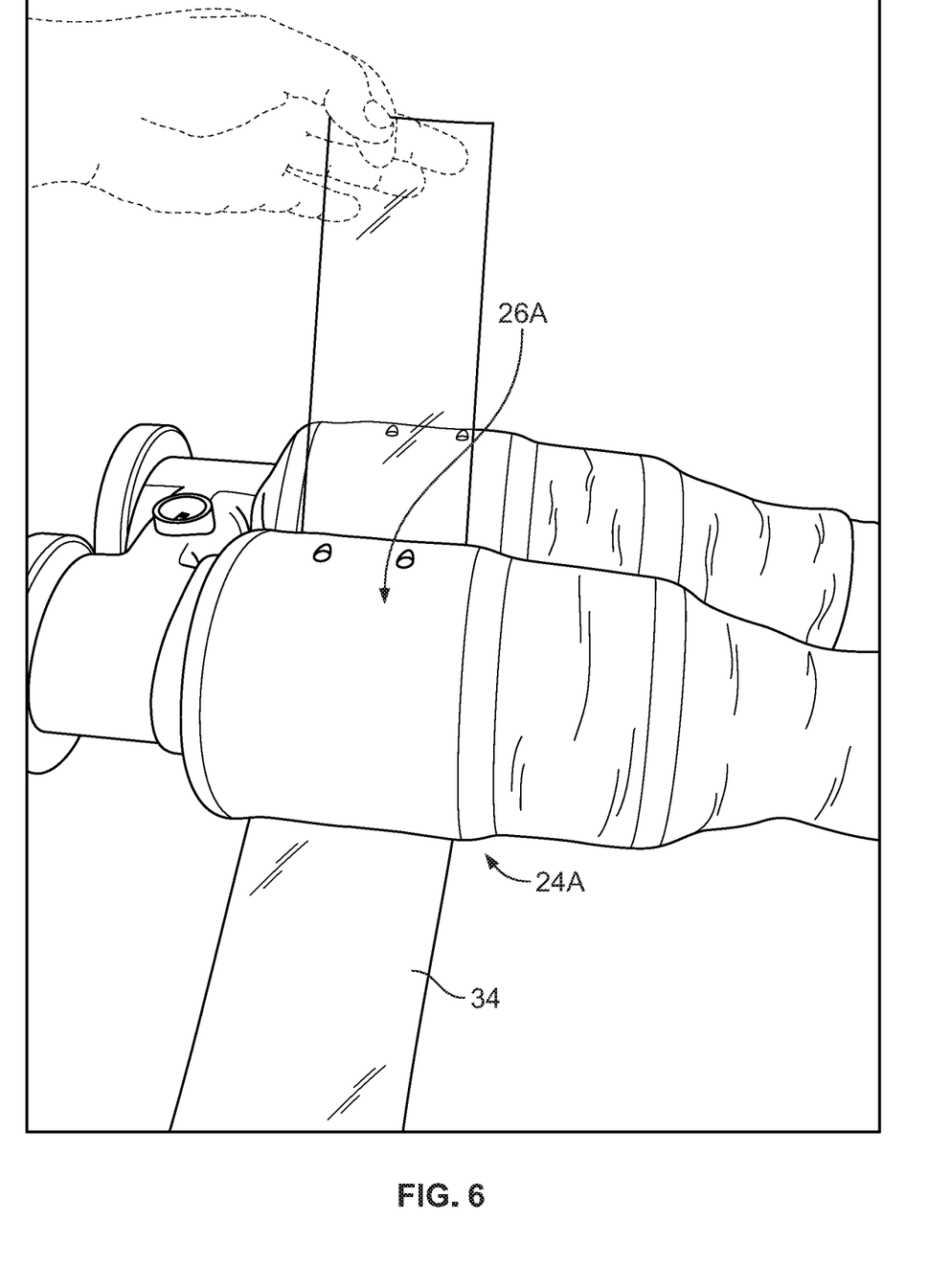
FIG. 6 is a perspective view illustrating the strip of flexible material of FIG. 5 adjacent the cold shrink sleeves of FIG. 3.

Referring to FIGS. 5 and 6, a sheet or strip of flexible material 34 (also referred to herein as a wraparound) is provided. The strip 34 includes first and second opposite ends 36, 38. The strip 34 includes first and second opposite sides 40, 42. The strip 34 has a width W1 that may be selected to cover the entire damaged area (see, e.g., damaged area 26A in FIG. 6). The strip 34 has a length L1 that may be selected such that the strip 34 wraps around the entire circumference of the damaged product (e.g., the sleeve 24A). In some embodiments, and as described in more detail below, the length L1 is selected such that the first and second ends 36, 38 overlap when the strip 34 is wrapped around the entire circumference of the damaged product.

The strip 34 may be formed of any suitable material. In some embodiments, the strip 34 is a polymer film. For example, the strip 34 may be a polyester film such as BoPET (Biaxially-oriented polyethylene terephthalate) or mylar film. In some other embodiments, the strip 34 may be a cloth formed of cotton or other fiber.

The strip 34 may be transparent. As described below, this helps an installer view the underlying sealant that forms a sealant layer.

The strip 34 may be thin to help provide a compact seal repair system. For example, the strip 34 may have a thickness t1 of less than 2 mm or less than 1 mm.

Figure 7:
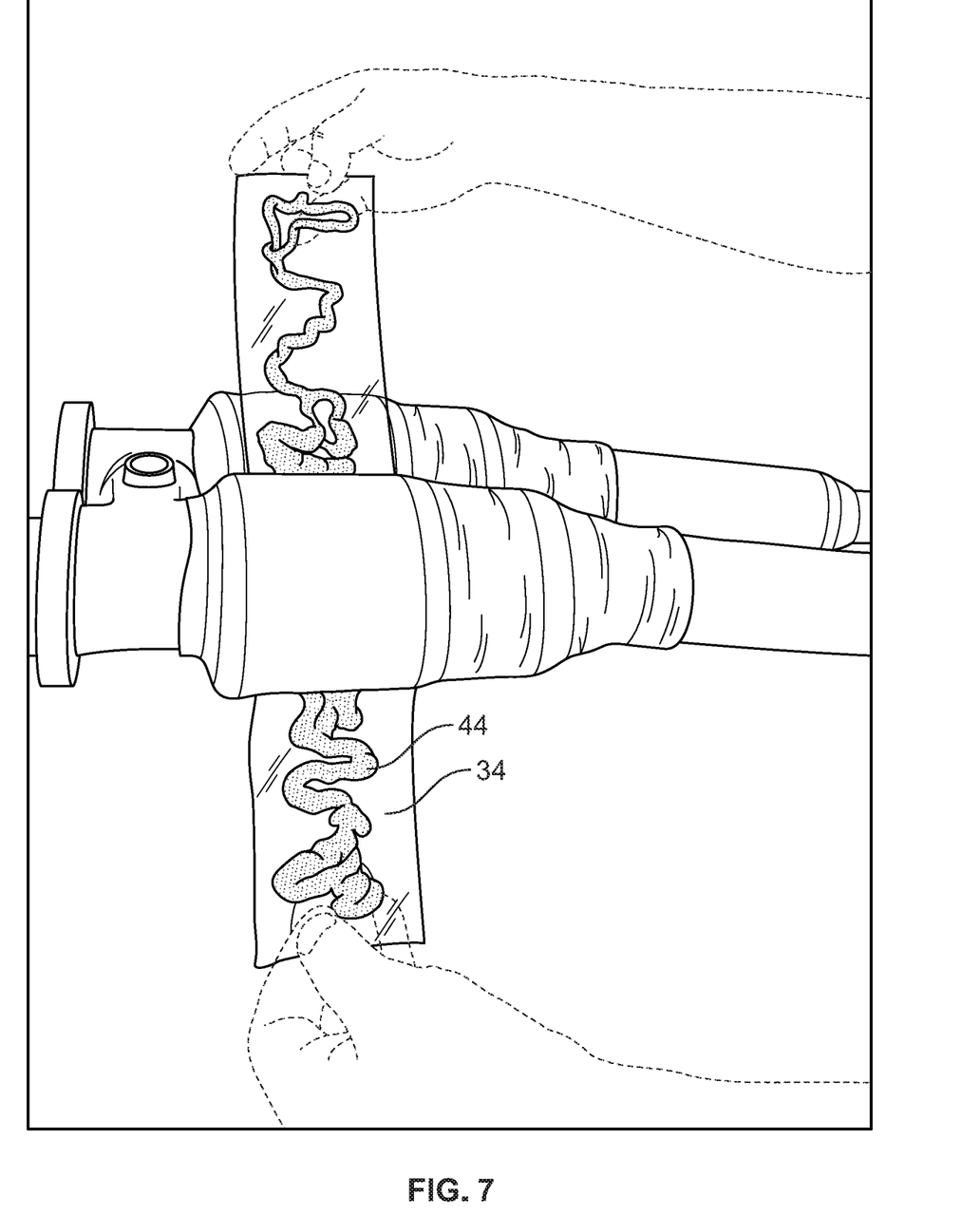
FIG. 7 is a perspective view illustrating the application of sealant on the strip of flexible material of FIG. 5.

Referring now to FIG. 7, an installer applies sealant 44 on the first side 40 of the strip 34. The applied sealant 44 may extend from the first end 36 of the strip 34 to the second end 38 of the strip 34 (FIG. 5).

The sealant may be an adhesive. The sealant may be a self-curing sealant that is applied to the strip as a flowable substance and then cures to an elastomer state. In some embodiments, the sealant is room temperature vulcanizing (RTV) silicone. In some embodiments, the sealant is SI 593 Black RTV available from Loctite.

Figure 8:
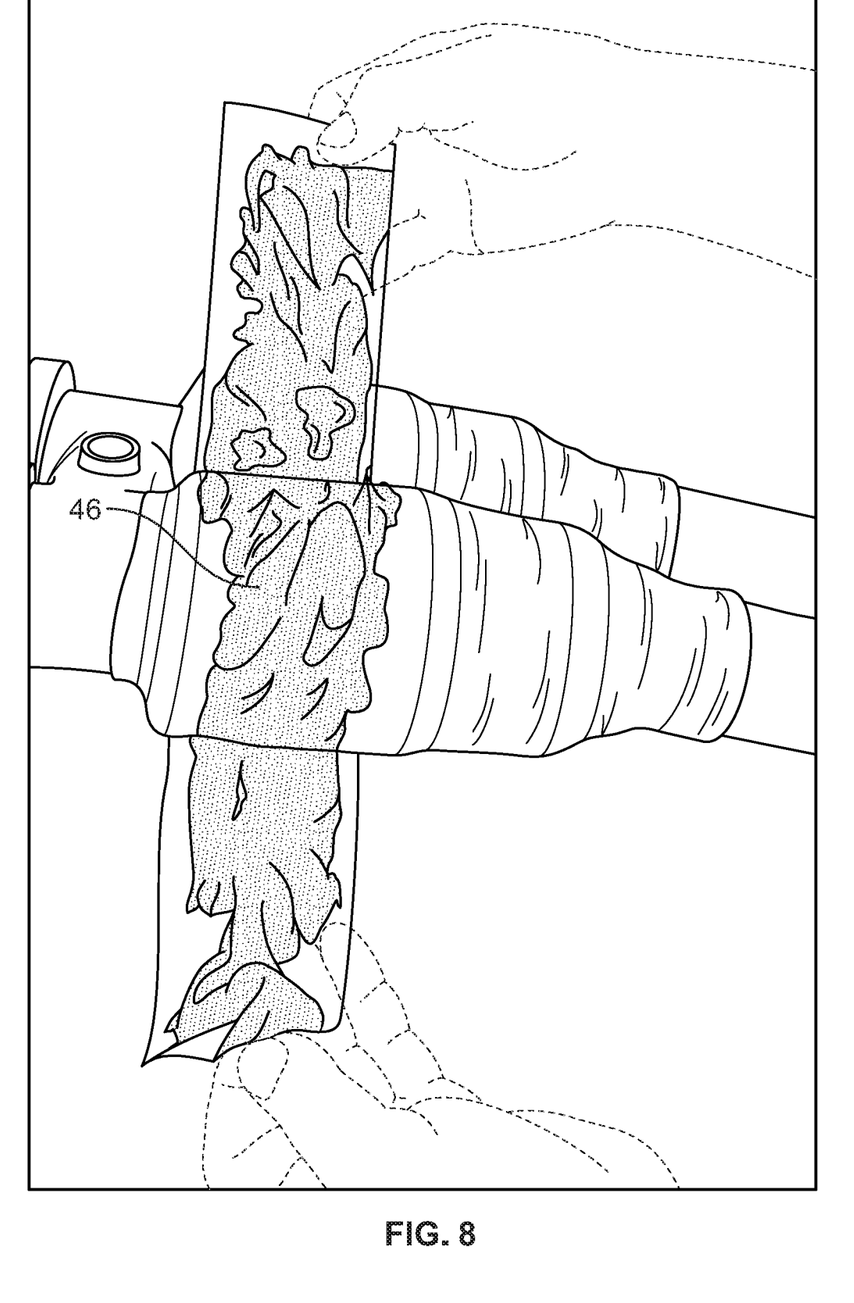
FIG. 8 is a perspective view illustrating the transfer of the sealant of FIG. 7 from the strip of flexible material to the cold shrink sleeve.

Once the sealant 44 has been applied to the strip 34, the installer slides the strip 34 and the sealant 44 relative to the sleeve 24A, and slides the sealant 44 against the sleeve 24A as illustrated in FIG. 8. This spreads the sealant 44 generally evenly around the entire circumference of the sleeve 24A while also covering the damaged area 26A with the sealant 44. This may create a preliminary sealant layer 46 on the outer surface of the sleeve 24A.

Figure 9:
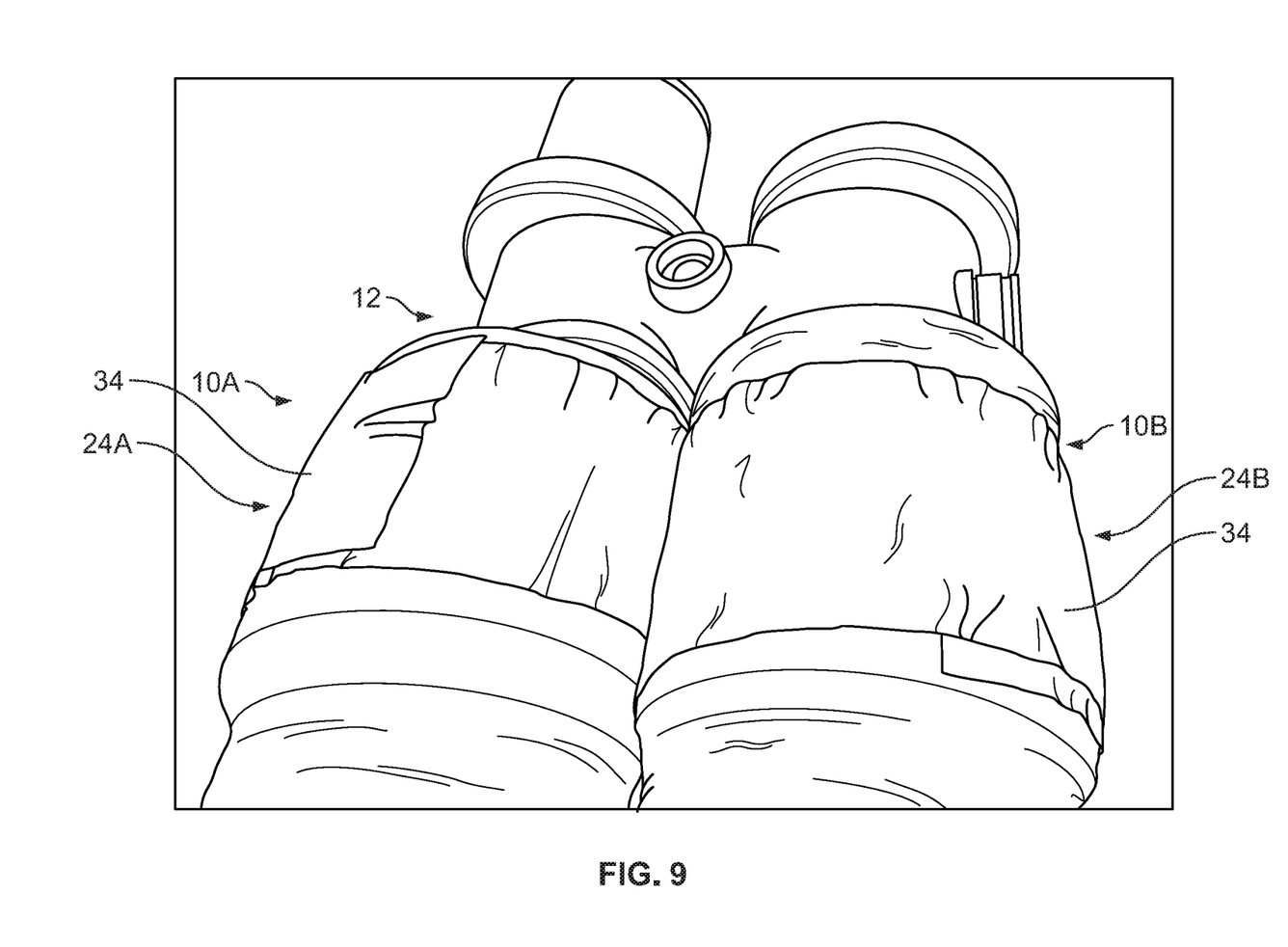
FIG. 9 is a perspective view illustrating the seal repair system of FIG. 1 on the cold shrink sleeves of FIG. 3.

The installer then wraps the strip 34 around the entire circumference of the sleeve 24A to form a seal system 10A shown in FIG. 9. Also shown in FIG. 9 is a seal system 10B with the strip 34 completely wrapped around the sleeve 24B. The sealant 44 or the preliminary sealant layer 46 holds the strip 34 in place (e.g., as the sealant cures).

In its wrapped state, the first and second ends 36, 38 may overlap as shown in FIG. 1. In some embodiments, the first and second ends 36, 38 may overlap by 2 to 3 inches.

As described above, the strip 34 may be a mylar film or a similar transparent film. This provides several advantages. First, the transparent film allows the installer to confirm that the sealant is applied over the entire circumference of the sleeve and also over the damaged area. The mylar film also has high tensile strength to provide a robust seal repair system.

Further, the thin strip of film allows for the application of the seal system when there is a small working space to apply the repair materials. For example, referring to FIG. 9, the sleeves 24A and 24B are very close together. The thin film and the sealant applied as described above provide a repair solution for such tight working conditions. It is difficult to apply known repair kits (e.g., mastic and/or tape or slidable rings) in such tight working spaces.

Cold shrink joints or sleeves contain greases such as silicone grease that can prevent proper adhesion with existing mastic and/or tape repair kits. RTV sealant does not have a negative reaction on the cold shrink joint as it is a silicone-based sealant. Repair installation is flexible as the RTV sealant (or preliminary sealant layer) provides enough tack to hold the mylar film around the repair site before completely curing. The mylar film holds the RTV sealant in place as it cures. As described above, the mylar film is transparent to provide a visual aid for the installer to ensure that sufficient sealant is used.

The cable system including the seal repair systems 10A and 10B were submerged in water for three days. The cable system was then removed from the water and the outer jacket layers 14A and 14B of the sleeves 24A and 24B were cut open. The present inventors discovered that the seal repair systems 10A and 10B prevented any moisture ingress.

It is contemplated that an RTV sealant that is different in color than the damaged outer jacket layer may be used to provide a clear contrast on the jacket layer surface. This may help further ensure that sufficient sealant is applied. It is also contemplated that different color RTV sealants and/or different color mylar film may be used for identification purposes such as to identify different electrical phases.

Figure 10:
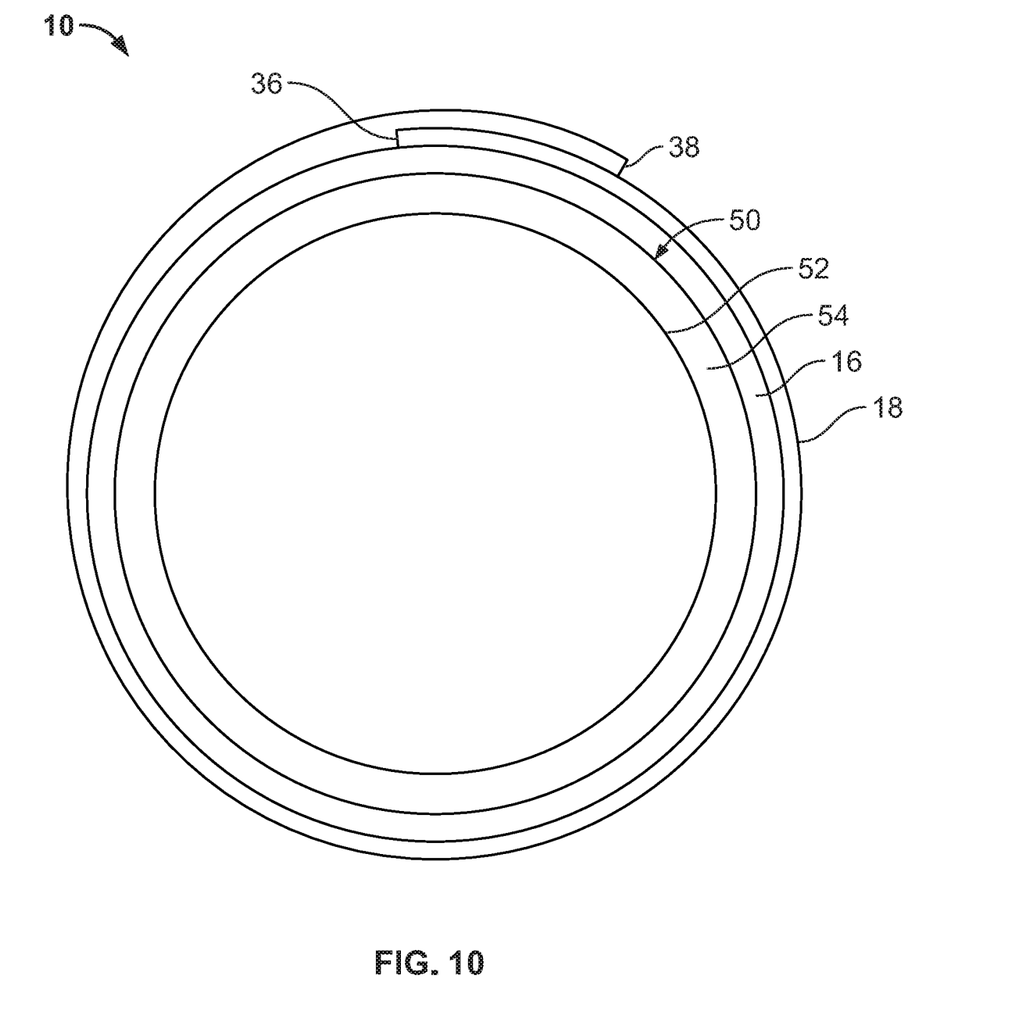
FIG. 10 is a sectional view of a seal repair system according to some embodiments of the present invention.

The seal repair systems have primarily been described above as repairing cold shrink sleeves. However, the seal repair systems may also be used to repair other cable accessories such as heat shrink covers. Further, the seal repair system may be used to repair the outer jacket layer of an electrical cable. Referring to FIG. 10, an electrical cable 50 includes an electrical conductor 52 surrounded by a concentric outer electrically insulating jacket 54. In some embodiments, the cable 50 includes additional layers such as an electromagnetic shield layer, a polymeric insulation layer, and/or a semiconductor layer. The cable 50 may be an electrical power transmission cable such as a medium voltage (e.g., between about 5 and 35 kV) or high voltage (e.g., between about 46 and 230 kV) power transmission cable.

As shown in FIG. 10, the seal repair system 10 including the sealant layer 16 and the strip of flexible material 18 can be used to repair damage to the outer jacket layer 54 of the cable in substantially the same way as described above.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the teachings and advantages of this invention. Accordingly, all such modifications are intended to be included within the scope of this invention as defined in the claims. The invention is defined by the following claims, with equivalents of the claims to be included therein.

The invention claimed is:

1. A method for repairing a damaged area of an outer jacket layer of a cable or cable accessory, the method comprising:
  applying sealant to a strip of flexible material; then
  forming a preliminary sealant layer on the damaged area and around an entire circumference of the outer jacket layer by sliding the strip of flexible material relative to the outer jacket layer with the sealant in contact with the outer jacket layer; then wrapping the strip of flexible material around the entire circumference of the outer jacket layer and the preliminary sealant layer, wherein the preliminary sealant layer holds the strip of flexible material in place after the wrapping; and allowing the sealant to cure to thereby form a final sealant layer on the damaged area and around the entire circumference of the outer jacket layer, wherein the strip of flexible material holds the sealant in place while allowing the sealant to cure, wherein forming the preliminary sealant layer comprises sliding the strip of flexible material circumferentially around the outer jacket layer such that the sealant is spread generally evenly around an entire circumference of the outer jacket layer.

2. The method of claim 1 wherein the sealant comprises room temperature vulcanizing (RTV) silicone.

3. The method of claim 1 wherein the strip of flexible material is transparent.

4. The method of claim 1 wherein the strip of flexible material comprises biaxially-oriented polyethylene terephthalate (BoPET) film.

5. The method of claim 1 wherein the strip of flexible material comprises first and second opposite ends, and wherein wrapping the strip of flexible material around the entire circumference of the outer jacket layer and preliminary sealant layer comprises overlapping the first and second ends.

6. The method of claim 1 wherein:
the strip of flexible material comprises first and second opposite sides;
the first side faces and contacts the preliminary sealant layer and then the final sealant layer; and
the second side faces away from the preliminary sealant layer and then the final sealant layer.

7. The method of claim 1 further comprising applying a solvent to the outer jacket layer prior to forming the sealant layer on the damaged area.

8. The method of claim 1 wherein the cable or cable accessory comprises a cold shrink sleeve.

9. The method of claim 1 wherein the cable or cable accessory comprises a cable.

10. The method of claim 1 wherein allowing the sealant to cure comprises allowing the sealant to cure without applying heat to the sealant.

11. A seal system comprising:
a cable or cable accessory comprising an outer jacket layer having a damaged area;
a sealant layer on the damaged area and surrounding an entire circumference of the outer jacket layer; and
a retention layer comprising a strip of flexible material directly on the sealant layer and surrounding the entire circumference of the outer jacket layer,
wherein the strip of flexible material comprises first and second opposite ends that overlap one another.

12. The system of claim 11 wherein the sealant layer comprises room temperature vulcanizing (RTV) silicone.

13. The system of claim 11 wherein the strip of flexible material is transparent.

14. The system of claim 11 wherein the strip of flexible material comprises BoPET film.

15. The system of claim 11 wherein:
the strip of flexible material comprises first and second opposite sides; and
the first side of the first end directly contacts the sealant layer and the first side of the second end overlies and optionally directly contacts the second side of the first end.

16. The system of claim 11 wherein:
the strip of flexible material comprises first and second opposite sides;
the first side faces and contacts the preliminary sealant layer and then the final sealant layer; and
the second side faces away from the preliminary sealant layer and then the final sealant layer.

17. The system of claim 11 wherein the cable or cable accessory comprises a cold shrink sleeve.

18. The system of claim 11 wherein the cable or cable accessory comprises a cable.

* * * * *